(12) United States Patent
Morita et al.

(10) Patent No.: US 6,388,005 B1
(45) Date of Patent: May 14, 2002

(54) EMULSION AND PROCESS OF PREPARING EMULSIONS AND OILY COMPOSITIONS

(75) Inventors: Yoshitsugu Morita; Kazuo Kobayashi, both of Chiba (JP)

(73) Assignee: Dow corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/707,508

(22) Filed: Nov. 7, 2000

(30) Foreign Application Priority Data

Nov. 1, 1969 (JP) .......................................... 11-324839

(51) Int. Cl.$^7$ ................................................ C08L 83/10
(52) U.S. Cl. ........................... 524/837; 528/14; 528/15; 528/31; 528/32; 528/25; 524/261; 524/81; 524/588; 525/478; 525/479; 525/100; 523/340; 568/673
(58) Field of Search .............................. 528/14, 15, 31, 528/25; 524/837, 261, 81; 525/478, 479, 100; 523/340; 568/673

(56) References Cited

U.S. PATENT DOCUMENTS

| 4,166,078 A | * | 8/1979 | Getson | |
|---|---|---|---|---|
| 4,980,167 A | | 12/1990 | Harashima et al. | ......... 424/401 |
| 4,987,169 A | | 1/1991 | Kuwata et al. | ............. 524/267 |
| 4,990,556 A | | 2/1991 | Shimizu et al. | ............. 524/475 |
| 5,760,109 A | | 6/1998 | Inokuchi et al. | ............. 523/414 |
| 6,057,386 A | | 5/2000 | Morita et al. | ................ 523/212 |

FOREIGN PATENT DOCUMENTS

| JP | 63-152308 | 6/1988 |
|---|---|---|
| JP | 01-81856 | 3/1989 |
| JP | 1-165509 | 6/1989 |
| JP | 1-207354 | 8/1989 |
| JP | 3-271211 | 12/1991 |
| JP | 7-330537 | 12/1995 |
| JP | 9-136813 | 5/1997 |

* cited by examiner

Primary Examiner—Robert Dawson
Assistant Examiner—Kuo-Liang Peng
(74) Attorney, Agent, or Firm—James L. DeCesare

(57) ABSTRACT

An emulsion of silicone oil or organic oil possesses excellent stability and contains cross-linked particles in drops of silicone oil or organic oil dispersed in water. The particles have an average diameter of 0.05 μm to 100 μm and are prepared by hydrosilylating a cross-linkable liquid composition of (A) an organic compound having at least two aliphatic unsaturated bonds in its molecule; (B) a silicon-containing organic compound having at least two silicon-bonded hydrogen atoms in its molecule; (C) a hydrosilylation reaction catalyst; and (D) an organopolysiloxane having at least one alkenyl group in its molecule. The particles are contained in drops of silicone oil or organic oil with an average diameter of 0.1 μm to 500 μm that are dispersed in water.

10 Claims, No Drawings

EMULSION AND PROCESS OF PREPARING EMULSIONS AND OILY COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to an emulsion of a silicone oil or organic oil, a process for preparing the emulsion, and a process for preparing a silicone oil composition or organic oil composition. More particularly, the invention relates to emulsions which have excellent stability comprising cross-linked particles in drops of silicone or organic oil dispersed in water, and oil compositions with excellent viscoelastic properties and good dispersibility of the cross-linked particles in silicone or organic oils.

BACKGROUND OF THE INVENTION

Japanese Patent Application Sho 64-81,856 and U.S. Pat. No. 4,980,167 describe a process for preparing cross-linked silicone particles containing a silicone oil by dispersing in water, a cross-linkable silicone composition containing a non-crosslinkable silicone oil, and then carrying out a cross-linking reaction. In another process described in U.S. Pat. No. 4,990,556, cross-linked silicone particles containing an organic oil are produced by dispersing in water, and then cross-linking, a cross-linkable silicone composition which contains a non-crosslinkable organic oil. These methods, however, do not obtain an emulsion of silicone oil or organic oil containing cross-linked particles in drops of silicone oil or organic oil dispersed in water.

Japanese Patent Application Hei 3-271,211 and U.S. Pat. No. 5,760,109, on the other hand describe a process in which an emulsion with cross-linked silicone particles and silicone oil drops in water, is obtained by combining cross-linked silicone particles with a silicone oil emulsion prepared by dispersing silicone oil drops in water. In another known process, an emulsion with organic oil drops and cross-linked silicone particles dispersed in water is produced by combining cross-linked silicone particles with an organic oil emulsion prepared by dispersing organic oil drops in water. In these methods, however, the silicone or organic oil drops and the cross-linked silicone particles are dispersed in water independently from each other, and therefore such methods do not obtain a silicone oil or organic oil emulsion in which cross-linked particles are contained in drops of the silicone oil or organic oil.

Japanese Patent Applications Sho 63-152,308, Hei1 -165, 509, and Hei 1-207,354, U.S. Pat. No. 4,987,169, and 7-330,537, describe a silicone oil composition with cross-linked silicone particles dispersed in a silicone oil. Japanese Application Hei 9-136,813 describes an organic oil composition containing cross-linked silicone particles dispersed in an organic oil. This oil composition is produced by mixing a silicone oil with cross-linked silicone particles, or by subjecting a cross-linked product of a cross-linkable silicone composition that contains a non-crosslinkable silicone oil to the action of shearing force. These methods, however, do not obtain a silicone oil composition or an organic oil composition containing cross-linked particles with good dispersibility in the silicone or organic oil.

BRIEF SUMMARY OF THE INVENTION

It is therefore an object of the invention to provide (i) a silicone oil or an organic oil emulsion which possesses excellent stability, and which comprises cross-linked particles in drops of silicone oil or organic oil dispersed in water, (ii) a process for preparing such an emulsion, and (iii) a process for preparing an oil composition with excellent viscoelastic properties and good dispersibility of the cross-linked particles in the silicone oil or organic oil.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The silicone oil or the organic oil emulsion of the invention comprises cross-linked particles which have an average diameter in the range of 0.05 to 100 $\mu$m. The particles are cross-linked by hydrosilylating a liquid cross-linkable composition comprising (A) an organic compound having in its molecule at least two aliphatic unsaturated bonds; (B) a silicon-containing organic compound having in its molecule at least two silicon-bonded hydrogen atoms; and (C) a hydrosilylation reaction catalyst. If desired, the liquid cross-linkable composition may also contain D) an organopolysiloxane having at least one alkenyl group in its molecule. The cross-linked particles are contained in drops of silicone oil or organic oil with an average diameter in the range of 0.1 to 500 $\mu$m, which in turn are dispersed in water. The diameter of the cross-linked particles is smaller than the diameter of the drops.

The process for preparing emulsions which contain a non-crosslinkable silicone oil or organic oil are obtained by (i) dispersing in water, a liquid cross-linkable composition comprising (A) an organic compound having at least two aliphatic unsaturated bonds in its molecule; (B) a silicon-containing organic compound having at least two silicon-bonded hydrogen atoms in its molecule; (C) a hydrosilylation reaction catalyst; optionally (D) an organopolysiloxane having at least one alkenyl group in its molecule; and a non-crosslinkable silicone oil or organic oil in an amount exceeding the amount of oil that can be held by the product of cross-linking of the liquid cross-linkable composition; and (ii) subjecting the liquid cross-linkable composition to a hydrosilylation reaction. The oil composition is obtained by removing water from the emulsion of silicone oil or organic oil containing the cross-linked particles in drops of the silicone or organic oil.

The emulsion of silicone oil or organic oil comprises cross-linked particles in drops of a silicone oil or organic oil dispersed in water. There are no limitations regarding the type of silicone oil that can be used in the emulsion. For example, the silicone oil may have a linear, partially branched linear, cyclic, or branched molecular structure. A linear or a cyclic molecular structure is preferred. The silicone oil is a material that does not contribute to the hydrosilylation reaction used in forming the cross-linked particles, and some representative oils are dimethylpolysiloxanes having both molecular terminals capped with trimethylsiloxy groups, methylphenylpolysiloxanes having both molecular terminals capped with trimethylsiloxy groups, copolymers of methylphenylsiloxane and dimethylsiloxane having both molecular terminals capped with trimethylsiloxy groups, copolymers of methyl (3,3,3-trifluoropropyl) siloxane and dimethylsiloxane having both molecular terminals capped with trimethylsiloxy groups, cyclic dimethylsiloxanes, cyclic methylphenylsiloxanes, silicone oils having polyether groups, long-chain alkyl groups, epoxy groups, carboxylic groups, ester groups, amido groups, amino groups, or mercapto groups.

There are also no limitations with regard to the type of organic oil used in the emulsion, but it is preferred to use oil compatible with the liquid cross-linkable composition used to form the cross-linked particles. The organic oil may be an aromatic oil or an aliphatic oil having a linear, partially branched linear, cyclic, or branched molecular structure. Organic oils having linear or cyclic molecular structures are particularly preferred. The organic oils may be volatile. The oils should not take part in the hydrosilylation reaction used for forming the cross-linked particles. Some representative organic oils are hexane, heptane, paraffin, isoparaffin, or similar alkanes; toluene, xylene, or similar aromatic compounds; methylisobutylketone or similar ketones; undecyl alcohol or similar alcohols; dibutyl ether or similar ethers; isopropyl laurate, isopropyl palmitate, or similar esters. Volatile alkanes are particularly preferred.

The silicone oil and organic oil can be used in combinations with each other, or they can be used with other components dissolved in them. If the silicone oil or the organic oil is volatile, then by removing the volatile silicone oil or the volatile organic oil and water from the obtained silicone oil or organic oil emulsion, one can obtain a mixture of cross-linked particles with the other components dissolved in a silicone oil or organic oil.

Provided they are soluble in the silicone oil or organic oil, there are no specific limitations with regard to other components which are dissolved in the silicone oil or organic oil, and some representative substances are, for example, silicone resins which are solid at room temperature, silicone oils that are rubber-like at room temperature; carnauba wax, candelilla wax, Japan wax, whale wax, jojoba wax, montan wax, beeswax, lanolin, or similar waxes; liquid paraffin, isoparaffin, hexyl laurate, isopropyl myristate, myristyl myristate, cetyl myristate, 2-octyldodecyl myristate, isopropyl palmitate, 2-ethylhexyl palmitate, butyl stearate, decyl oleate, 2-octyldodecyl oleate, myristyl lactate, cetyl lactate, lanolin acetate, stearyl alcohol, cetostearyl alcohol, oleyl alcohol, avocado oil, almond oil, olive oil, cacao oil, jojoba oil, sesame oil, safflower oil, soy oil, White Camellia oil, squalane, persic oil, castor oil, mink oil, cottonseed oil, coconut oil, egg yolk oil, lard, or similar fats and oils; polypropylene glycol monooleate, neopentylglycol-2-ethylhexanoate, or similar glycol ester oils; palm oil fatty acid triglyceride or similar polyhydric alcohol ester oil; polyoxyethylene lauryl ether, polyoxypropylene cetyl ether, or similar polyoxyalkylene ether oil.

There are no specific limitations with regard to the viscosity of the organic oil or the silicone oil used in the emulsion. It is preferred, however, that the viscosity be in the range of 1 mPa·s to 100,000,000 mPa·s, preferably 2 to 10,000,000 mPa·s at 25° C. It is also preferred that the drops of silicone oil or organic oil used in the emulsion have an average diameter in the range of 0.1 μm to 500 μm, preferably 0.2 μm to 500 μm, and more preferably 0.5 μm to 500 μm, with 0.5 μm to 200 μm being especially preferred. If the diameter of the oil drops is smaller than the lower limit of the range, the preparation of the emulsion is difficult. If the diameter of the drops exceeds the upper limit of the range, the emulsion has low stability.

Cross-linked particles used in the emulsions are obtained by subjecting to hydrosilylation, a liquid cross-linkable composition comprising (A) an organic compound having at least two aliphatic unsaturated bonds in its molecule; (B) a silicon-containing organic compound having at least two silicon-bonded hydrogen atoms in its molecule; (C) a hydrosilylation reaction catalyst; and optionally (D) an organopolysiloxane having at least one alkenyl group in its molecule.

Organic compounds that represents component (A) are characterized by having in their molecule at least two aliphatic unsaturated bonds such as a vinyl group, allyl group, butenyl group, pentenyl group, or similar alkenyl group; an ethynyl group or similar alkynyl group; a norbornene, dicyclopentadienyl, or similar cyclic unsaturated terminal or side-chain group; a vinylene group, propenylene group, or similar ethylene group inside the main molecular chain. Most preferred are a vinyl group or an allyl group. There are no specific limitations with regard to the form of component (A), and it may be a solid or liquid, although liquids are preferred. If component (A) is a solid, it should be dissolved in another component or in an organic solvent capable of dissolving component (A). There are no limitations with regard to the molecular weight of component (A), but it is preferred that the average molecular weight be in the range of 50 to 50,000.

Some examples of compounds suitable for use as component (A) are pentadiene, hexadiene, heptadiene, octadiene, nonadiene, cyclopentadiene, cyclooctadiene, or similar dienes; divinylbenzene or similar aromatic dienes; diallyl ether, triethylene glycol divinyl ether, cyclohexadimethanol divinyl ether, 1,2-divinylglycol, or similar ether; diallyl isophthalate, diallyl phthalate, diallylterephthalic acid, diallylmaleate, triallyltrimellitate, or similar diene; an oligomer obtained by polymerizing the aforementioned compounds; an olefin oligomer which is obtained by polymerizing ethylene, propylene, butene, isobutene, pentene, hexene, or similar olefin, and which contains a group with at least two aliphatic unsaturated bonds; an oligomer obtained by polymerizing acrylic monomers with acrylic groups such as allyl methacrylate, butenyl methacrylate, methylbutenyl methacrylate, methylpropenyl methacrylate, heptenyl methacrylate, and hexenyl methacrylate; an oligomer obtained by copolymerizing the aforementioned acrylic monomers with other monomers such as methyl methacrylate, ethyl methacrylate, butyl methacrylate, ethylhexyl methacrylate, lauryl methacrylate, styrene, α-methylstyrene, maleic acid, vinyl acetate, allyl acetate, or similar monomer; an oligomer obtained by reacting a carboxylic acid anhydride which contains an alkenyl group such as allyl isocyanate, methacryloyl isocyanate, or 2-isocyanate ethyl methacrylate, with an oligomer obtained by copolymerizing the aforementioned monomers with an acrylic monomer containing a hydroxyl group such as 2-hydroxyethyl methacrylate, 2-hydroxypropyl methacrylate, and 4-hydroxybutyl methacrylate; an oligomer obtained by reacting an alkenyl alcohol such as allyl alcohol, butene diol, 2-(allyloxy) ethanol, glycerol diallyl ether, cyclohexene methanol, methyl butynol, oleyl alcohol, or similar alkenyl alcohol; an oligomer obtained by reacting an epoxy compound that contains an alkenyl group such as glycidyl methacrylate or allyl glycidyl ether with an oligomer obtained by copolymerizing the aforementioned monomers with an oligomer obtained by polymerizing methacrylic acid, itaconic acid, maleic acid, or similar monomer that contains a carboxyl group; or an oligomer obtained by copolymerizing the aforementioned monomers with the monomer that contains a carboxy group; a polyether obtained by the ring-opening polymerization of allyl glycidyl ether using ethylene glycol as an initiator or a polyether obtained by the ring-opening polymerization of vinylcyclohexane-1,2-epoxide using propargyl alcohol as initiator; a polyester that contains alkenyl groups obtained by reacting the aforementioned alkenyl alcohols with a polyhydric alcohol such as ethylene glycol, propylene glycol, 1,6-hexane diol, diethylene glycol, neopentyl glycol, the ester of neopentyl glycol hydroxy pivalinate, or trimethylol propane, with a polybasic acid such as phthalic anhydride, isophthalic acid, terephthalic acid, adipic acid, azelaic acid, or trimellitic acid. Most preferred are dienes, diene oligomers, or polyethers.

Component (B) is a silicon containing organic compound having at least two silicon-bonded hydrogen atoms. There are no specific limitations with regard to the viscosity of component (B). It is preferred, however, that the viscosity be in the range of 1 mPa·s to 100,000 mPa·s, preferably 1 to 10,000 mPa·s at 25° C. Component (B) can be an organohydrogenpolysiloxane or an organic polymer that contains a diorganohydrogensilyl group. An organohydrogenpolysiloxane is preferred.

The organohydrogenpolysiloxane can have a linear, branched, cyclic, network, or linear partially branched molecular structure. Some representative examples of such polysiloxanes are methylhydrogenpolysiloxanes having both molecular terminals capped with trimethylsiloxy groups, copolymers of methylhydrogensiloxane and dimethylsiloxane having both molecular terminals capped with trimethylsiloxy groups; copolymers of methylphenylsiloxane, methylhydrogensiloxane, and dimethylsiloxane having both molecular terminals capped with trimethylsiloxy groups; copolymers of methylphenylsiloxane, dimethylsiloxane having both molecular terminals capped with dimethylhydrogensiloxy groups, and dimethylpolysiloxane having both molecular terminals capped with dimethylhydrogensiloxy groups; methylphenylpolysiloxanes with both molecular terminals capped with dimethylhydrogensiloxy groups; an organopolysiloxane copolymer composed of $R_3SiO_{1/2}$ units, $R_2HSiO_{1/2}$ units, and $SiO_{4/2}$ units; an organopolysiloxane copolymer composed of $R_2HSiO_{1/2}$ units and $SiO_{4/2}$ units; an organopolysiloxane copolymer composed of $RHSiO_{2/2}$ units, $RHSiO_{3/2}$ units, $HSiO_{3/2}$ units; and mixtures of two or more of such organopolysiloxanes. R in such units represents a univalent hydrocarbon group other than an alkenyl group, such as methyl, ethyl, propyl, butyl, pentyl, hexyl, heptyl, or similar alkyl groups; phenyl, tolyl, xylyl, naphthyl, or similar aryl groups; benzyl, phenethyl, or similar aralkyl groups; and chloromethyl, 3-chloropropyl, 3,3,3-trifluoropropyl, or similar halogenated alkyl groups.

When component (B) is an organic polymer containing a diorganohydrogensilyl group, it can be an oligomer obtained by copolymerization of an acrylic monomer having dimethylhydrogensilyl groups such as dimethylhydrogensilyl methacrylate and dimethylhydrogensilylpropyl methacrylate, with a monomer represented by methyl methacrylate, ethyl methacrylate, butyl methacrylate, ethylhexyl methacrylate, lauryl methacrylate, styrene, α-methylstyrene, maleic acid, vinyl acetate, and allyl acetate.

It is preferred that the content of component (B) in the liquid cross-linkable composition be in the range of 0.1 parts by weight to 500 parts by weight, preferably 0.5 to 500 parts by weight, and more preferably 1 to 100 parts by weight. If the content of component (B) is below the lower limit of the range, the liquid cross-linkable composition may not be sufficiently crosslinked. If the content of component (B) exceeds the upper limit of the range, an excess of silicon-bonded hydrogen atoms may generate gaseous hydrogen.

Component (C) is a hydrosilylation reaction catalyst used for accelerating the hydrosilylation reaction and for cross-linking the liquid cross-linkable composition. It can be a platinum catalyst, a rhodium catalyst, or a palladium catalyst, but a platinum catalyst is preferred. The platinum catalyst can be in the form of platinum on fine silica powder, platinum on fine carbon powder, chloroplatinic acid, an alcoholic solution of chloroplatinic acid, a platinum olefin complex, a platinum alkenylsiloxane complex, or a platinum carbonyl complex.

There are no specific limitations on the content of component (C) in the liquid cross-linkable composition provided it is sufficient for accelerating the hydrosilylation reaction of the liquid cross-linkable composition. It is preferred that when a platinum catalyst is used as component (C), it should be present in an amount of from $1 \times 10^{-7}$ parts by weight to $1 \times 10^{-3}$ parts by weight, based on 100 parts by weight of the sum of components (A) and (B), or the sum of components (A), (B), and (D). If component (C) is used in an amount smaller than the lower limit of the range, there is risk of insufficient cross-linking. If component (C) is present in an amount exceeding the upper limit of the range, it will be economically inefficient.

Organopolysiloxane component (D) is an optional component of the liquid cross-linkable composition. It contains at least one alkenyl group in its molecule and can be used either for improving the affinity of obtained cross-linked particles for the silicone oil, or for imparting flexibility and rubber elasticity. It is preferred that component (D) be an organopolysiloxane having at least two alkenyl groups in its molecule. The alkenyl group of component (D) may be group such as vinyl, allyl, butenyl, pentenyl, and hexenyl, but vinyl is preferred. Silicon atom-bonded groups other than alkenyl groups in component (D) are univalent hydrocarbon groups such as methyl, ethyl, propyl, butyl, or similar alkyl groups; cyclopentyl, cyclohexyl, or similar cycloalkyl groups; phenyl, tolyl, xylyl, or similar aryl groups; benzyl, phenethyl, 3-phenylpropyl, or similar aralkyl group; 3-chloropropyl, 3,3,3-trifluoropropyl, or similar halogenated hydrocarbon group. Component (D) may be linear, branched, cyclic, network, or partially-branched linear. A linear structure is preferred. There are no specific limitations on the viscosity of component (D), however, it is preferred that it be from 20 mPa·s to 100,000 mPa·s, preferably 20 to 10,000 mPa·s at 25° C.

Some representative examples of component (D) are copolymers of methylvinylsiloxane and dimethylsiloxane having both molecular terminals capped with trimethylsiloxy groups, methylvinylpolysiloxanes having both molecular terminals capped with trimethylsiloxy groups, copolymers of methylphenylsiloxane, methylvinylsiloxane, and dimethylsiloxane having both molecular terminals capped with trimethylsiloxy groups, dimethylpolysiloxanes having both molecular terminals capped with dimethylvinylsiloxy groups, methylvinylpolysiloxanes having both molecular terminals capped with dimethylvinylsiloxy groups, copolymer of methylvinylsiloxane and dimethylsiloxane having both molecular terminals capped with dimethylvinylsiloxy groups, copolymers of methylphenylsiloxane, methylvinylsiloxane, and dimethylsiloxane having both molecular terminals capped with dimethylvinylsiloxy groups, organopolysiloxane copolymers containing $R_3SiO_{1/2}$ siloxane units, $R_2R^1SiO_{1/2}$ siloxane units, and $SiO_{4/2}$ siloxane units, organopolysiloxane copolymers composed of siloxane units $R_2R^1SiO_{1/2}$ and siloxane units $SiO_{4/2}$, organopolysiloxane copolymers composed of siloxane units $RR^1SiO_{2/2}$, siloxane units $RSiO_{3/2}$, and siloxane units $R^1SiO_{3/2}$. These organopolysiloxane units can be present in combinations of two or more. R in the units represents a univalent hydrocarbon group other than alkenyl, and is the same as the groups referred to above. $R^1$ is an alkenyl group such as vinyl, allyl, butenyl, pentenyl, hexenyl, and heptenyl.

Component (D) should be present in the liquid cross-linkable composition in such an amount that the weight ratio of component (A) to component (D) is in the range of from 0.1:99.9 to 99.9:0.1, preferably 0.5:99.5 to 50:50. If component (D) is present in an amount exceeding the upper limit of the range, obtained cross-linked particles exhibit a tendency towards decreased affinity for organic oils. If the content is below the lower limit of the range, obtained cross-linked particles have a decreased affinity for silicone oils.

In addition to components (A) to (D), the liquid cross-linkable composition may contain other components such as reaction inhibitors for regulating hydrosilylation reactions; reinforcing fillers such as precipitated silica, fumed silica, calcined silica, fumed titanium oxide; non-reinforcing fillers such as powdered quartz, diatomaceous earth, alumosilicic acid, iron oxide, zinc oxide, calcium carbonate; and fillers obtained by surface-treating any of the previous fillers with organosilicon compounds such as hexamethylsilazane, trimethylchlorosilane, polydimethylsiloxane, or polymethylhydrogensiloxane.

The liquid crosslinkable composition should be crosslinked by a hydrosilylation reaction to form a rubber-like, gel-like, or elastomer-like, or resin-like cross-linked product.

The average diameter of the cross-linked particles in the emulsion of the invention should be in the range of 0.05 $\mu$m to 100 $\mu$m, preferably 0.1 $\mu$m to 100 $\mu$m, and more preferably 0.1 $\mu$m to 50 $\mu$m. When the average diameter of the drops of silicone oil or organic oil is in the range of 0.2 $\mu$m to 500 $\mu$m, the cross-linked particles should have an average diameter of 0.1 $\mu$m to 100 $\mu$m, preferably 0.1 $\mu$m to 50 $\mu$m. If the average diameter of the drops of silicone oil or organic oil is in the range of 0.5 $\mu$m to 500 $\mu$m, the cross-linked particles should have an average diameter of 0.1 $\mu$m to 100 $\mu$m, preferably 0.1 $\mu$m to 50 $\mu$m. If the drops of silicone oil or organic oil have an average diameter between 0.5 $\mu$m and 200 $\mu$m, the cross-linked particles should have an average diameter of 0.1 $\mu$m to 100 $\mu$m, preferably 0.1 $\mu$m to 50 $\mu$m. If the average diameter of the cross-linked particles is below the lower limit of the preferred range, the preparation of such particles tends to become more difficult. If the diameter of the cross-linked particles exceeds the upper limit of the range, the emulsion exhibits a tendency toward decreased stability. In emulsions of the invention, the cross-linked particles should be smaller in size than the drops of the silicone oil or the organic oil. The cross-linked particles can be spherical, spindle-like, flattened, or irregular in shape, but a spheical shape is preferred.

The are no specific limitations with regard to the amount of silicone oil or organic oil used in emulsions according to the invention provided the cross-linked particles are held in the drops of silicone or organic oil. It is preferred however that emulsions be prepared containing the silicone oil or the organic oil in an amount of 50 parts by weight to 5,000 parts by weight, preferably 100 to 5,000 parts by weight, and more preferably 200 to 5,000 parts by weight, based on 100 parts by weight of the liquid cross-linkable composition used to form the cross-linked particles. The most preferred range for the content of the silicone oil or the organic oil is 250 parts by weight to 2,000 parts by weight.

There are no specific limitations with regard to the amount of water that can be used in emulsions according to the present invention. It is preferred however that the amount of water be in the range of 5 weight percent to 99 weight percent, preferably 10 to 80 weight percent, based on the total weight of the emulsion.

The emulsion of the invention may contain a surface-active agent to ensure the stability of the dispersion in water of the drops of silicone oil or organic oil containing cross-linked particles. Representative surface-active agents are cationic surface-active agents such as alkyltrimethylammonium salts, dialkyldimethylammonium salts, tetraalkylammonium salts, trialkylbenzylammonium salts, alkylpyridinium salts, and polyethylene polyamine fatty acid amide salts; anionic surface-active agents such as fatty acid salts, alkylbenzylsulfonic acid salts, alkylnaphthalenesulfonic acid salts, alkylsulfonic acid salts, α-olefinsulfonic acid salts, dialkylsulfosuccinic acid salts, α-sulfonated fatty acid salts, alkylsufuric acid salts, sulfated fats and oils, polyoxyethylene alkyl ether sulfuric acid salts, polyoxyethylene alkylphenyl ether sulfuric acid salts, polyoxyethylene styrenated phenyl ether sulfuric acid salts, alkylphosphoric acid salts, and polyoxyethylene alkylphenyl ether phosphoric acid salts; zwitterionic surface-active agents such as N,N-dimethyl-N-alkyl-N-carboxymethyl ammonium betaine, N,N-dialkylaminoalkylene carboxylic acid salts, N,N,N-trialkyl-N-sulfoalkylene ammonium betaine, and N,N-dialkyl-N,N-bispolyoxyethylene ammonium sulfuric acid ester bentaine; and nonionic surface-active agents such as polyoxyethylene alkyl ether, polyoxyethylene alkenyl ether, polyoxyethylene alkylphenyl ether, polyoxyethylene polystyrene phenyl ether, polyoxyethylene-polyoxypropylene glycol, polyoxyethylene-polyoxypropylene alkyl ether, sorbitan fatty acid esters, glycerol fatty acid esters, decaglycerol fatty acid esters, polyglycerol fatty acid esters, propylene glycol-pentaerythritol fatty acid esters, propylene glycol-pentaerythritol fatty acid esters, polyoxyethylene sorbitan fatty acid esters, polyoxyethylene glycerol fatty acid esters, polyoxyethylene fatty acid esters, polyglycerol fatty acid esters, polyoxyethylenated castor oil, fatty acid diethanolamide, polyoxyethylene alkylamine, triethanolamine fatty acid partial ester, and trialkyleneamine oxides. Most preferred are the nonionic surface-active agents.

There are no specific limitations with regard to the amount of surface-active agent used in the liquid cross-linkable composition. It is preferred however to use 0.1 parts by weight to 20 parts by weight, preferably 0.5 to 10 parts by weight of surface-active agent, based on 100 parts by weight of the silicone oil or the organic oil containing the cross-linked particles.

The emulsion of the present invention can be used as an additive for cosmetics, dyes, and organic resins. The removal of water from the emulsion permits the preparation of a liquid, cream-like, paste-like, or grease-like, silicone oil or organic oil composition containing dispersed cross-linked particles in the silicone or the organic oil. If the oil is volatile, it is then possible (i) to prepare a mixture of cross-linked particles with other components dissolved in the silicone or organic oil by first dissolving the other components in the oil, and then removing water and the volatile oil from the obtained emulsion, or (ii) to prepare cross-linked particles containing organosilicon or other organic compounds which are difficult to incorporate into cross-linked particles.

The process for preparing an emulsion of silicone oil or organic oil according to the present invention is characterized by dispersing in water using a surface-active agent, a liquid cross-linkable composition containing a non-crosslinkable silicone oil or a non-crosslinkable organic oil, and cross-linking the liquid cross-linkable composition by a hydrosilylation reaction. In the process for preparing the emulsion, the non-crosslinkable silicone oil or the non-crosslinkable organic oil do not contribute to cross-linking occurring as a result of the hydrosilylation of the liquid cross-linkable composition.

In accordance with the process for preparing emulsions, the liquid crosslinkable composition consists of components (A)–(C), optionally component (D), and other optional components of the types previously discussed. According to the process, the liquid crosslinkable composition containing a catalyst used for hydrosilylation reactions in water is prepared either (i) by dispersing the liquid crosslinkable composition including component (C) which has been added in advance, or (ii) by dispersing the liquid crosslinkable composition which does not include component (C) in water, and then adding component (C) to the water. In the latter case, it is preferred to add component (C) in the form of an aqueous dispersion with an average particle diameter of not more than about 1 $\mu$m.

The non-crosslinkable silicone oil or the non-crosslinkable organic oil contained in the liquid cross-linkable composition should be present in an amount exceeding the amount of non-crosslinkable oil that can be held in the product of cross-linking of the liquid cross-linkable composition. Thus, it should be in excess of the amount of non-crosslinkable silicone oil or organic oil that can be contained in the cross-linked product. The amount will vary depending on the proportions of the liquid cross-linkable composition and the non-crosslinkable silicone or organic oil. In general, however, it is preferred that the non-crosslinkable silicone oil or organic oil be used in an amount of 50 parts by weight to 5,000 parts by weight, preferably 100 to 5,000 parts by weight, more preferably 200 to 5,000 parts by weight, and especially preferably 250 to 2,000 parts by weight, based on 100 parts by weight of liquid cross-linkable composition.

The process for preparing emulsions consists in dispersing in water the liquid cross-linkable composition containing the non-crosslinkable silicone oil or organic oil, and then crosslinking the composition by a hydrosilylation reaction. The liquid cross-linkable composition can be dispersed in water by using devices such as homomixers, paddle mixers, Henschel mixers, homodispersers, colloid mills, impeller agitators, homogenizers, in-line continuous action emulsifiers, ultrasonic emulsifiers, and vacuum kneaders.

There are no specific limitations with regard to the amount of added water used in the process, but it is preferred that it be in the range of 5 weight percent to 99 weight percent, preferably 10 to 80 weight percent, based on the total weight of the emulsion.

To create stable dispersions of the liquid cross-linkable composition in water, it is preferred to use one or more of the above described cationic surface-active agents, anionic surface-active agents, zwitterionic surface-active agents, or nonionic surface-active agents. The use of a nonionic surface-active agent is preferred. There are no specific limitations with regard to the amount of surface-active agent used, however it is preferred that it be present in the range of 0.1 parts by weight to 20 parts by weight, preferably 0.5 to 10 parts by weight, based on 100 parts by weight of the liquid cross-likable composition containing the non-crosslinkable silicone oil or organic oil.

The liquid cross-linkable composition dispersed in water can be cross-linked by hydrosilylation carried out by heating the emulsion of liquid cross-linkable composition, or by allowing it to stand at room temperature.

The process for preparing the silicone oil composition or the organic oil composition consists in removing water from the emulsion of the silicone oil or organic oil. Water can be removed from the oil emulsion by air drying, hot-air drying, vacuum drying, or heat drying. The resulting silicone oil composition or organic oil composition will contain a cross-linked product that is well dispersed in the silicone oil or organic oil. The composition can be in the form of a liquid, cream, paste, or grease. The cross-linked particles contained in the drops of silicone oil or the drops of organic oil in such silicone oil compositions or organic oil compositions should have an average diameter of from 0.05 $\mu$m to 100 $\mu$m, preferably 0.1 $\mu$m to 100 $\mu$m, more preferably 0.1 $\mu$m to 50 $\mu$m. Such an oil composition can be used as a lubricating agent, or it can be used as an agent to impart lubricating properties. In addition, it has applications as an additive for cosmetics, dyes, plastics, and organic resins.

APPLICATION EXAMPLES

The emulsion, the process for its preparation, and the process for preparing the oily composition, are further described by way of the following practical examples. In these examples, all viscosity values were measured at 25° C. The average diameter of the emulsion particles, the stability of the emulsion, the average diameter of the cross-linked particles, their dispersibility, and the characteristics of the oily compositions, were determined by the particular procedures described below.

Average Diameter of Emulsion Particles

An average diameter of emulsion particles was determined as a median diameter which is the particle diameter corresponding to 50% of the cumulative distribution. It was obtained by the measurement of emulsion particle diameters using a diffraction-type diameter distribution analyzer Model LA-500 of Horiba Ltd.

Emulsion Stability 180 mL of the emulsion was hermetically sealed in a 225-mL glass bottle. The bottle had a height of 105 mm and a diameter of 50 mm. The emulsion was allowed to stand for one week at room temperature. The thickness of the layer of water that separated from the emulsion was then measured.

Average Diameter of Cross-Linked Particles

The emulsion was air-dried on a glass plate, and then a sample was prepared by collecting cross-linked particles under a stereoscopic microscope. Their average diameter was calculated as an average of the diameters of 10 particles.

Dispersibility of Cross-Linked Particles

The emulsion was air-dried on a glass plate, and then the shape of the cross-linked particles, their state of aggregation, and the particle distribution were observed under a stereoscopic microscope. A symbol "○" was used to designate that all particles were dispersed as primary particles; the symbol "X" was used to designate that the particles were aggregate particles having dimensions of several 100 $\mu$m or primary particles having dimensions exceeding 500 μm; and the symbol "Δ" was used to designate an intermediate condition.

Viscoelastic Properties of Oil Composition

The storage modulus of elasticity expressed as G'(×10³ dyne/cm²), the loss elastic modulus expressed as G"(×10³ dyne/cm²), and the tangent of loss angle tan δ, were measured using a viscoelasticity analyzer ARES of Rheometric Scientific, Inc. Measurements were carried out at room temperature using 25 mm parallel plates, a gap of 0.5 mm to 0.6 mm, a strain of 10%, and a vibration frequency of 0.1–50 rad/sec.

Application Example 1

A liquid cross-linkable composition was prepared by mixing 170 parts by weight of polypropylene oxide with a viscosity of 390 mPa·s having both molecular terminals capped with allyl groups, and having an average molecular weight of 3000; 3.0 parts by weight of an organopolysiloxane having at least three silicon-bonded hydrogen atoms in its molecule, a viscosity of 20 mPa·s, and having the formula

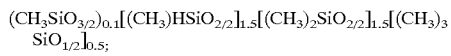

$(CH_3SiO_{3/2})_{0.1}[(CH_3)HSiO_{2/2}]_{1.5}[(CH_3)_2SiO_{2/2}]_{1.5}[(CH_3)_3SiO_{1/2}]_{0.5}$;

and 80 parts by weight of a dimethylpolysiloxane with a viscosity of 100 mPa·s having both molecular terminals capped with trimethylsiloxy groups. To the liquid cross-linkable composition was added 53 parts by weight of a 3 weight percent aqueous solution of polyoxyethylene nonyl phenyl ether having an HLB of 13.1. The mixture was then emulsified, and then combined with 50 parts by weight of demineralized water, yielding an aqueous emulsion of liquid cross-linkable composition.

Another aqueous emulsion of liquid cross-linkable composition was prepared by uniformly mixing the above aqueous emulsion of liquid cross-linkable composition with a separately prepared aqueous emulsion of a platinum catalyst consisting of a 1,3-divinyl-1,1,3,3-tetramethyldisiloxane solution. The main component was a 1,3-divinyl-1,1,3,3-tetramethyldisiloxane complex of platinum having an average platinum catalyst particle size of 0.05 μm and a platinum metal concentration of 0.05 weight percent. The mixture contained platinum metal by weight in an amount of 20 ppm, based on the content of solid matter in the emulsion.

This emulsion was subjected to hydrosilylation by allowing it to stand for one day at room temperature, yielding a silicone oil emulsion containing cross-linked particles in drops of silicone oil dispersed in water.

The emulsion was transferred to an aluminum plate with a diameter of 5 cm, and water was removed from the emulsion by air-drying it in a draft for 3 days, yielding a silicone oil composition of silicone oil and cross-linked particles. The silicone oil composition was a cream-like substance. Observation of the silicone oil composition under a stereoscopic microscope revealed that the cross-linked particles were uniformly dispersed in the silicone oil, and that the crosslinked particles had a spherical shape.

Application Example 2

A liquid cross-linkable composition was prepared by uniformly mixing at 5° C., 2.46 parts by weight of 1,5-hexadiene of a molecular weight of 82.15; 17.54 parts by weight of a copolymer of methylhydrogensiloxane and dimethylsiloxane with a viscosity of 50 mPa·s, and having both molecular terminals capped with trimethylsiloxy groups; 80 parts by weight of a dimethylpolysiloxane with a viscosity of 6 mPa·s and having both molecular terminals capped with trimethylsiloxy groups; and an isopropyl alcohol solution of chloroplatinic acid in an amount such that by weight, the liquid cross-linkable composition contained 50 ppm of platinum metal.

This liquid cross-linkable composition was quickly mixed with one hundred parts weight of an aqueous solution of 1.65 weight percent of polyoxyethylene (9) nonyl phenyl ether prepared at 25° C., and then the mixture was combined with 200 parts by weight of demineralized water, yielding an aqueous emulsion of liquid crosslinkable composition. The emulsion was allowed to stand for 24 hours at 35° C., which resulted in crosslinking via an hydrosilylation reaction, to yield a silicone oil emulsion containing cross-linked particles in silicone oil drops dispersed in water.

This emulsion was transferred to an aluminum plate with a diameter of 5 mm, water was removed by air-drying it in a draft for 3 days, yielding a silicone oil composition containing silicone oil and cross-linked particles. The silicone oil composition was a cream-like substance. Observation of the silicone oil composition under a stereoscopic microscope revealed that the cross-linked particles were uniformly dispersed in the silicone oil, and that the crosslinked particles spherically shaped.

Application Example 3

A liquid cross-linkable composition was prepared by mixing 6.43 parts by weight of a polypropylene oxide with a viscosity of 390 mPa·s, having both molecular terminals capped with allyl groups, and a molecular weight of 3000; 6.43 parts by weight of a dimethylpolysiloxane with a viscosity of 100 mPa·s and having both molecular terminals capped with dimethylvinylsiloxy groups; 7.14 parts by weight of an organopolysiloxane with a viscosity of 20 mPa·s, having at least three silicon-bonded hydrogen atoms in its molecule, and of the formula

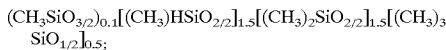

$(CH_3SiO_{3/2})_{0.1}[(CH_3)HSiO_{2/2}]_{1.5}[(CH_3)_2SiO_{2/2}]_{1.5}[(CH_3)_3SiO_{1/2}]_{0.5}$;

and 80 parts by weight of a dimethylpolysiloxane with a viscosity of 100 mPa·s having both molecular terminals capped with trimethylsiloxy groups. After adding 53 parts by weight of a 3-weight percent aqueous solution of polyoxyethylene nonyl phenyl ether with an HLB of 13.1 to the liquid cross-linkable composition, the mixture was emulsified, combined with 50 parts by weight of demineralized water, yielding an aqueous emulsion of a liquid cross-linkable composition.

Another aqueous emulsion of liquid cross-linkable composition was prepared by uniformly mixing this aqueous emulsion of liquid cross-linkable composition with a separately prepared aqueous emulsion of platinum catalyst consisting of a 1,3-divinyl-1,1,3,3-tetramethyldisiloxane solution in which the main component was a 1,3-divinyl-1,1,3,3-tetramethyldisiloxane complex of platinum. The average platinum catalyst particle size was 0.05 μm and there was present a platinum metal concentration of 0.05 weight percent. The platinum metal was present by weight in an amount of 20 ppm based on the content of solid matter in the emulsion.

The liquid cross-linkable composition was subjected to hydrosilylation by allowing the emulsion to stand for one day at room temperature, yielding a silicone oil emulsion containing cross-linked particles in drops of silicone oil dispersed in water.

This silicone oil emulsion was transferred to an aluminum plate with a diameter of 5 cm, and water was removed from the emulsion by allowing it to air-dry in a draft for 3 days, yielding a silicone oil composition containing the silicone oil and the cross-linked particles. The silicone oil composition was a cream-like substance. Observation of the silicone oil composition under a stereoscopic microscope revealed that the cross-linked particles were uniformly dispersed in the silicone oil and that the crosslinked particles spherically shaped.

Application Example 4

A liquid cross-linkable composition was prepared by uniformly mixing at 5° C., 1.1 parts by weight of 1,5-hexadiene having a molecular weight of 82.15; 8.9 parts by weight of a dimethylpolysiloxane with a viscosity of 400 mPa·s having both molecular terminals capped with dimethylvinylsiloxy groups; 10 parts by weight of a copolymer of methylhydrogensiloxane and dimethylsiloxane with a viscosity of 50 mPa·s having both molecular terminals capped with trimethylsiloxy groups; 80 parts by weight of a dimethylpolysiloxane with a viscosity of 6 mPa·s having both molecular terminals capped with trimethylsiloxy groups; and an isopropyl alcohol solution of chloroplatinic acid in an amount such that the content of platinum metal in the liquid cross-linkable composition was 50 ppm.

The liquid cross-linkable composition was then quickly mixed with 100 parts weight of an aqueous solution of 1.65 weight percent of polyoxyethylene (9) nonyl phenyl ether. The mixture was combined with 200 parts by weight of demineralized water, yielding an aqueous emulsion of a liquid crosslinkable composition. The emulsion was allowed to stand for 24 hours at 35° C., which resulted in its crosslinking via hydrosilylation, yielding a silicone oil emulsion containing cross-linked particles in silicone oil drops dispersed in water.

This silicone oil emulsion was transferred to an aluminum plate with a diameter of 5 cm, and water was removed from the silicone oil emulsion by air-drying it in a draft for 3 days, yielding a silicone oil composition containing silicone oil and cross-linked particles. The silicone oil composition was a cream-like substance, and observation of the silicone oil composition under a stereoscopic microscope revealed that the cross-linked particles were uniformly dispersed in the silicone oil and that the crosslinked particles spherical.

Comparative Example 1

Composition (I) was prepared by uniformly mixing 100 parts by weight of a dimethylpolysiloxane with a viscosity of 1,000 mPa·s, having both molecular terminals capped with hydroxyl groups, with the content of hydroxyl groups being 1.3 weight percent; 10 parts by weight of a methylhydrogenpolysiloxane with a viscosity of 10 mPa·s, having both molecular terminals capped with trimethylsiloxy groups, and a content of silicon-bonded hydrogen atoms of 1.5 weight percent; and 50 parts by weight of a dimethylpolysiloxane with a viscosity of 1,000 mPa·s having both molecular terminals capped with trimethylsiloxy groups.

Composition (II) was prepared by uniformly mixing 100 parts by weight of a dimethylpolysiloxane with a viscosity of 1,000 mPa·s, having both molecular terminals capped with hydroxyl groups, and a content of hydroxyl groups of 1.3 weight percent; 50 parts by weight of a dimethylpolysiloxane with a viscosity of 1,000 mPa·s having both molecular terminals capped with trimethylsiloxy groups; and 1.5 parts by weight of dibutyltin dioctate.

A liquid cross-linkable silicone composition was prepared by uniformly mixing composition (I) and composition (II) in a weight ratio of 1:1. It was then combined with a mixture of 5 weight percent Tergitol® TMN-6, an ethylene oxide adduct of trimethyl nonanol of Union Carbide Corporation, and 1,700 parts by weight of ion exchanged water. The mixture was uniformly emulsified, yielding an emulsion of a liquid cross-linkable silicone composition. The emulsion was spray-dried using a spray drier with an inlet temperature of 300° C. and an outlet temperature of 100° C. The spray drying removed water from the emulsion, and yielded 98 percent cross-linked particles. The cross-linked silicone particles had properties similar to the properties of rubber, and the cross-linked silicone particles were spherical. No bleeding of silicone oil from the cross-linked silicone particles was observed. Although cross-linked silicone particles were formed in this Comparative Example, they could not be measured.

Comparative Example 2

Using a planetary mixer, a liquid cross-linkable silicone composition was prepared by mixing 44.5 parts by weight of a dimethylpolysiloxane with a viscosity of 5 mPa·s having both molecular terminals capped with vinylmethylsiloxy groups; 100 parts by weight of a methylhydrogenpolysiloxane with a viscosity of 20 mPa·s, having both molecular terminals capped with trimethylsiloxy groups, and a content of silicon-bonded hydrogen atoms of 1.5 weight percent; and 758 parts by weight of a dimethylpolysiloxane with a viscosity of 6 mPa·s having both molecular terminals capped with trimethylsiloxy groups. To the mixture was added 0.5 parts by weight of a 2-weight percent isopropyl alcohol solution of chloroplatinic acid. The mixture was heated to 70–80° C., and the resulting liquid cross-linkable silicone composition was stirred for 2 hours. The composition cross-linked via hydrosilylation yielding a soft silicone composition. The soft silicone composition was subjected to kneading on a three-roll mill under shearing force, yielding a paste-like silicone composition. Observation of the silicone composition under a stereoscopic microscope showed that it contained irregularly shaped cross-linked silicone particles dispersed in silicone oil. The dispersion was non-uniform and contained large cross-linked silicone particles of a size varying from 100 μm to 500 μm.

Application Example 5

A liquid cross-linkable composition was prepared at 5° C. by uniformly mixing 2.46 parts by weight of 1,5-hexadiene having a molecular weight of 82.15; 17.54 parts by weight of a copolymer of methylhydrogensiloxane and dimethylsiloxane with a viscosity of 50 mPa·s having both molecular terminals capped with trimethylsiloxy groups; 80 parts by weight of an isoparaffin with a viscosity of 2.4 mPa·s, a carbon number of 16, marketed under the tradename Isozol 400 by Nippon Petrochemicals Co., Ltd.; and an isopropyl alcohol solution of chloroplatinic acid in an amount such that by weight, the composition contained 50 ppm of platinum metal.

This liquid cross-linkable composition was then quickly mixed with 100 parts weight of an aqueous solution of 1.65 weight percent polyoxyethylene (9) nonyl phenyl ether, and it was emulsified in a colloid mill. The emulsion was then combined with 200 parts by weight of demineralized water, yielding an aqueous emulsion of liquid crosslinkable composition. This emulsion was allowed to stand for 24 hours at 35° C., which resulted in crosslinking via hydrosilylation, to yield a silicone oil emulsion containing cross-linked particles in isoparaffin drops dispersed in water.

The silicone oil emulsion was transferred to an aluminum plate with a diameter of 5 cm and water was removed from the silicone oil emulsion by allowing it to air-dry in a draft for three days, yielding a silicone oil composition containing isoparaffin and cross-linked particles. The isoparaffin composition was a cream-like substance. Observation of the isoparaffin composition under a stereoscopic microscope revealed that cross-linked particles were uniformly dispersed in the isoparaffin, and that the crosslinked particles were spherical.

TABLE 1

| | Example No. | | | | | | |
|---|---|---|---|---|---|---|---|
| Item | Appl. Ex. 1 | Appl. Ex. 2 | Appl. Ex. 3 | Appl. Ex. 4 | Appl. Ex. 5 | Comp. Ex. 1 | Comp. Ex. 2 |
| Emulsion Average Diameter ($\mu$m) | 5 | 4 | 4 | 5 | 5 | 5 | — |
| Stability (mm) | 0 | 0 | 2 | 2 | 2 | 49 | — |
| Cross-Linked Particles Average Diameter ($\mu$m) | 3 | 2 | 2 | 3 | 3 | 5 | 17 |
| Dispersibility | ○ | ○ | ○ | ○ | ○ | x | — |
| Viscoelasticity of Oil Composition | | | | | | | |
| G' 1 rad/s | 0.5 | 37 | 0.3 | 10 | 15 | — | 5.0 |
| 10 rad/s | 1.1 | 41 | 0.5 | 18 | 22 | — | 7.5 |
| G" 1 rad/s | 0.5 | 7.9 | 0.1 | 7.1 | 6.8 | — | 4.7 |
| 10 rad/s | 1.3 | 8.1 | 0.4 | 6.2 | 5.3 | — | 4.0 |
| Tan δ 1 rad/s | 1.2 | 0.22 | 0.57 | 0.71 | 0.46 | — | 0.82 |
| 10 rad/s | 1.2 | 0.22 | 0.82 | 0.34 | 0.25 | — | 0.58 |

Comparative Example 3

A liquid cross-linkable silicone composition was prepared by mixing 94 parts by weight of a dimethylpolysiloxane with a viscosity of 400 mPa·s having both molecular terminals capped with dimethylvinylsiloxy groups; and 6 parts by weight of a copolymer of methylhydrogensiloxane and dimethylsiloxane with a viscosity of 30 mPa·s, having both molecular terminals capped with trimethylsiloxy groups, and a content of silicon-bonded hydrogen atoms of 0.5 weight percent. To this mixture was added 53 parts by weight of a 3-weight percent aqueous solution of polyoxyethylene nonyl phenyl ether having an HLB of 13.1, and the liquid cross-linkable composition was emulsified, and further combined with 50 parts by weight of demineralized water. The result was an aqueous emulsion of a liquid cross-linkable composition.

Another aqueous emulsion of liquid cross-linkable composition was prepared by uniformly mixing the above aqueous emulsion of liquid cross-linkable composition with a separately prepared aqueous emulsion of a platinum catalyst consisting of a 1,3-divinyl-1,1,3,3-tetramethyldisiloxane solution in which the main component was a 1,3-divinyl-1,1,3,3-tetramethyldisiloxane complex of platinum. It had an average platinum catalyst particle size of 0.05 $\mu$m, and the platinum metal concentration was 0.05 weight percent. The content of platinum metal was by weight an amount of 20 ppm based on the content of solid matter in the emulsion.

The liquid cross-linkable silicone composition was subjected to hydrosilylation by maintaining the emulsion for one day at room temperature, yielding an aqueous suspension of cross-linked silicone particles dispersed in water. The suspension was combined and uniformly mixed with 50 weight percent of an emulsion containing a dimethylpolysiloxane with a viscosity of 100 mPa·s and having both molecular terminals capped with trimethylsiloxy groups. The amount of dimethylpolysiloxane with viscosity of 100 mPa·s used was four times that of the cross-linked silicone particles. The mixture was transferred to an aluminum plate with a diameter of 5 cm, and water was removed by air-drying in a draft for 3 days, yielding a silicone oil composition containing silicone oil and cross-linked particles. The silicone oil composition was a cream-like substance. However, silicone oil floated on the surface of the liquid, and observation of the silicone oil under a stereoscopic microscope revealed that cross-linked particles were dispersed in the silicone oil in a non-uniform fashion.

Emulsions of silicone or organic oils containing the cross-linked particles in drops of oil and dispersed in water according to the invention possess excellent stability. The process also enables one to prepare an oil composition with improved dispersibility of cross-linked particles in silicone or organic oils having excellent viscoelastic properties.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A process of preparing an emulsion of cross-linked particles in drops of silicone oil or organic oil by dispersing in water using a surface-active agent, a liquid crosslinkable composition comprising (A) an organic compound having at least two aliphatic unsaturated bonds in its molecule, (B) a silicon-containing organic compound having at least two silicon-bonded hydrogen atoms in its molecule, (C) a hydrosilylation reaction catalyst, and a non-crosslinkable silicone oil or organic oil, cross-linking the crosslinkable composition by hydrosilylation, the emulsion containing cross-linked particles with an average diameter of 0.05 $\mu$m to 100 $\mu$m in drops of silicone oil or organic oil with an average diameter of from 0.1 $\mu$m to 500 $\mu$m in water.

2. The process according to claim 1 in which the silicone oil or organic oil has a viscosity of 1 mPa·s to 100,000,000 mPa·s at 25° C.

3. The process according to claim 1 in which component (B) is present in the cross-linkable composition in an amount of 0.1 parts by weight to 500 parts by weight based on 100 parts by weight of component (A), and component (C) is present in a catalytic amount.

4. The process according to claim 1 in which the cross-linkable composition contains (D) an organopolysiloxane having at least one alkenyl group in its molecule.

5. The process according to claim 4 in which the weight ratio of component (A) to component (D) is in the range of 0.1:99.9 to 99.9:0.1, component (B) is present in an amount of 0.5 parts by weight to 500 parts by weight based on 100 parts by weight of the sum of components (A) and (D), and component (C) is present in a catalytic amount.

6. The process according to claim 1 in which component (A) is a diene, diene oligomer, or polyether.

7. The process according to claim 1 in which component (B) is an organohydrogenpolysiloxane.

8. The process according to claim 1 in which water is removed from the emulsion.

9. An emulsion prepared according to the process defined in claim 1.

10. A composition prepared according to the process defined in claim 8.

* * * * *